United States Patent [19]

Fife

[11] Patent Number: 4,502,884

[45] Date of Patent: Mar. 5, 1985

[54] METHOD FOR PRODUCING FIBER-SHAPED TANTALUM POWDER AND THE POWDER PRODUCED THEREBY

[75] Inventor: James A. Fife, Douglassville, Pa.

[73] Assignee: Cabot Corporation, Boston, Mass.

[21] Appl. No.: 545,862

[22] Filed: Oct. 27, 1983

[51] Int. Cl.³ .................................................. B22F 9/00
[52] U.S. Cl. ............................ 75/0.5 AB; 75/0.5 BB; 75/251
[58] Field of Search ............... 75/0.5 AB, 0.5 BB, 251

[56] References Cited

U.S. PATENT DOCUMENTS 3,827,865 8/1974 Douglass .............................. 29/192

FOREIGN PATENT DOCUMENTS 3111418 10/1982 Fed. Rep. of Germany .

Primary Examiner—W. Stallard
Attorney, Agent, or Firm—Robert J. Feltovic; Jack Schuman

[57] ABSTRACT

A method for producing fiber-shaped tantalum powder by deforming a composite of tantalum powder and an auxiliary metal, and the powder produced thereby.

10 Claims, No Drawings

METHOD FOR PRODUCING FIBER-SHAPED TANTALUM POWDER AND THE POWDER PRODUCED THEREBY

Solid tantalum capacitors, made from tantalum powder, have been a major contribution to the miniaturization of electronic circuits and have made possible the application of such circuits in extreme environments. Tantalum powder capacitors typically are manufactured by compressing tantalum powder to form a pellet, sintering the pellet in a furnace to form a porous body, and then subjecting it to anodization in a suitable electrolyte to form a continuous dielectric oxide film on the sintered body.

Tantalum powder commonly is produced in the form of agglomerates of irregular-shaped, nodular particles. In an effort to improve tantalum powder properties, theoretical research has been performed which has predicted that the dendrite or fiber is the optimum shape for tantalum powder in order to achieve the highest capacitance while having a low rate of change of capacitance with respect to changes in sinter temperature.

Now, according to the present invention, it has been discovered that extremely fine fibers of tantalum can be made by first forming a composite of tantalum powder and an auxiliary metal and then working the composite by cold mechanical deformation until tantalum fibers of desired fineness are formed. The resulting matrix of tantalum fibers and the auxiliary metal then is leached with a suitable acid agent to remove the auxiliary metal. The method of the present invention also can be applied to the production of fiber-shaped powder from any suitable metal of Groups IV, V, and VI of the Periodic Table. Such suitable metals include Ti, V, Cr, Zr, Cb, Mo, Hf, Ta, W, and alloys thereof. Tantalum, however, is preferred. For purposes of illustration, tantalum powder specifically will be discussed in more detail below.

The auxiliary metal may be any metal having hardness and fabrication characteristics necessary for co-working with tantalum and which may be removed from the tantalum composite by acid leaching. A preferred auxiliary metal is copper.

The starting tantalum powder may be combined with the auxiliary metal component using any suitable chemical and/or physical procedure. For example, one may simply blend a mixture of tantalum and auxiliary metal powders, or the tantalum powder may be coated with the auxiliary metal using common techniques as chemical or vapor deposition, electroplating, and the like. The tantalum powder composite then can be formed into a shape suitable for mechanical working using any common technique such as molding, pressing, encasing the powder in an auxiliary metal tube, and the like. Forming the tantalum powder/auxiliary metal composite by powder metallurgical means is required in order to avoid thermal cycling of the tantalum powder which would cause undesireable oxygen pick-up in the tantalum. Temperatures above about 900° C. (1173° K.) would drive surface oxygen into the powder resulting in a hard and unrollable composite material.

Working the tantalum powder composite may be accomplished using any standard cold mechanical deformation technique, such as rolling, drawing, extruding, swaging, and the like. The amount of deformation required to produce tantalum fibers of the fineness desired is dependent upon the size of the starting tantalum nodular powder material. Any size of tantalum powder starting material may be used; larger starting diameters simply require more working to achieve a desired diameter of fiber than would a smaller diameter nodular starting material. However, there is a practical limit to the degree of working one can achieve using typical metal working equipment. A very large size reduction from starting powder to final fiber form would require many passes through different equipment. Such a routine of multiple passes increases the likelihood of metal failures, such as cracking or breaking. Accordingly, to accommodate processing with minimized working passes, it is preferred that the diameter of the starting nodular tantalum powder be no more than about five times the diameter desired in the final fiber product. Limiting the reduction in diameter from nodular powder to fiber also serves to avoid the production of fibers having excessive length, which could produce handling problems in the resultant fiber-shaped powder. For utility in fabricating capacitors, it is preferred that the produced tantalum fibers feature diameters smaller than about 10 $\mu$m, more preferably about 0.5 to about 3 $\mu$m. Lengths less than about 100 $\mu$m, in particular between about 20 and 50 $\mu$m, are preferred to accommodate handling.

After the tantalum powder composite has been worked sufficiently so as to accomplish the desired reduction in size for the tantalum fiber product, the resultant composite product is leached with a suitable mineral acid to remove the auxiliary metal component from the matrix. Any suitable mineral acid may be used which is capable of leaching the auxiliary metal out of the matrix. Typical acids include sulfuric acid, hydrochloric acid, nitric acid, combinations thereof, and the like. The remaining tantalum fiber can then be recovered.

The invention may be further understood by the following examples which are intended to be illustrative rather than limiting in nature.

EXAMPLE I

The starting tantalum material was a tantalum powder produced by hydriding an electron beam melted tantalum ingot. This electron beam tantalum hydride was jaw crushed, screened 10/40 mesh, and degassed at 900° C. (1173 ° K.). Seventy five (75) grams of this tantalum powder was mixed with three hundred-ninety (390) grams of an auxiliary metal, 100/200 mesh spherical copper powder. The composite mixture was poured into a 3/4 inch O.D. ($1.9 \times 10^{-2}$ m) (1/16 inch ($1.6 \times 10^{-3}$ m) wall thickness) 7 inch (0.18 m) long copper tube (standard soft copper water pipe) having one end crimped shut. After the powder mixture was loaded into the tube, the other end also was crimped shut, sealing the powder inside while providing sufficient air leaks for air to be removed. The tube then was subjected to working on a rolling mill and thus reduced to a ¼ inch by ¼ inch ($6.3 \times 10^{-3}$ m) square cross-section rod, about two feet ($6.2 \times 10^{-1}$ m in length. A one inch ($2.54 \times 10^{-2}$ m) sample of this rod was cut off and acid leached in aqua regia (3 parts HCl and 1 part HNO$_3$) to dissolve the copper component. Clearly elongated tantalum powder was recovered. The ¼ inch by ¼ inch ($6.3 \times 10^{-3}$ m) rod then was further worked on a rolling mill down to a ⅛ inch by ⅛ inch ($3.2 \times 10^{-3}$ m) square cross-section rod, about seven feet (2.1 m) in length. A one foot ($3.1 \times 10^{-1}$ m) section of this rod was dissolved in concentratd HNO$_3$ followed by concentrated HCl to remove copper. The resultant tantalum fibers were analyzed to be about 10,000 to 20,000 μm in length and 200 to 1,000 μm in diameter.

EXAMPLE II

Using a procedure similar to that described above, a second sample of electron beam tantalum powder (60/100 mesh) was mixed with 100/200 mesh copper powder and worked down to produce recovered tantalum fibers analyzed to have a diameter of about 30 μm and a length of about 3,000 μm.

The embodiments of the invention in which an exclusive property or privilege is claimed are defined as follows:

1. A method for producing fiber-shaped powder from suitable metals of Groups IV, V, VI of the Periodic Table comprising:
   forming a composite of said metal powder particles and an auxiliary metal by powder metallurgical techniques,
   working said metal/auxiliary metal composite by mechanical deformation until said metal particles are deformed into fiber shapes within a matrix of the auxiliary metal,
   removing said auxiliary metal from said matrix by treatment with a mineral acid suitable to dissolve the auxiliary metal, and
   recovering the fiber-shaped metal powder.

2. The method of claim 1 comprising forming a composite of tantalum powder particles and an auxiliary metal by admixing said tantalum particles with an auxiliary metal powder.

3. The method of claim 1 wherein said auxiliary metal is copper.

4. The method of claim 1 wherein the auxiliary metal is dissolved by treatment with a mineral acid selected from the group consisting of nitric acid, hydrochloric acid, sulfuric acid, and combinations thereof.

5. The method of claim 1 wherein the diameter of the tantalum particles in the tantalum/auxiliary metal composite is no more than about five times the diameter of the fiber-shaped tantalum powder product.

6. The fiber-shaped metal powder produced according to the method of claim 1.

7. The fiber-shaped tantalum powder of claim 6 having a diameter less than about 10 μm.

8. The fiber-shaped tantalum powder of claim 7 having a diameter between about 0.5 and 3 μm.

9. The fiber-shaped tantalum powder of claim 6 having a length less than about 100 μm.

10. The fiber-shaped tantalum powder of claim 9 having a length less between about 20 and 50 μm.

* * * * *